UNITED STATES PATENT OFFICE.

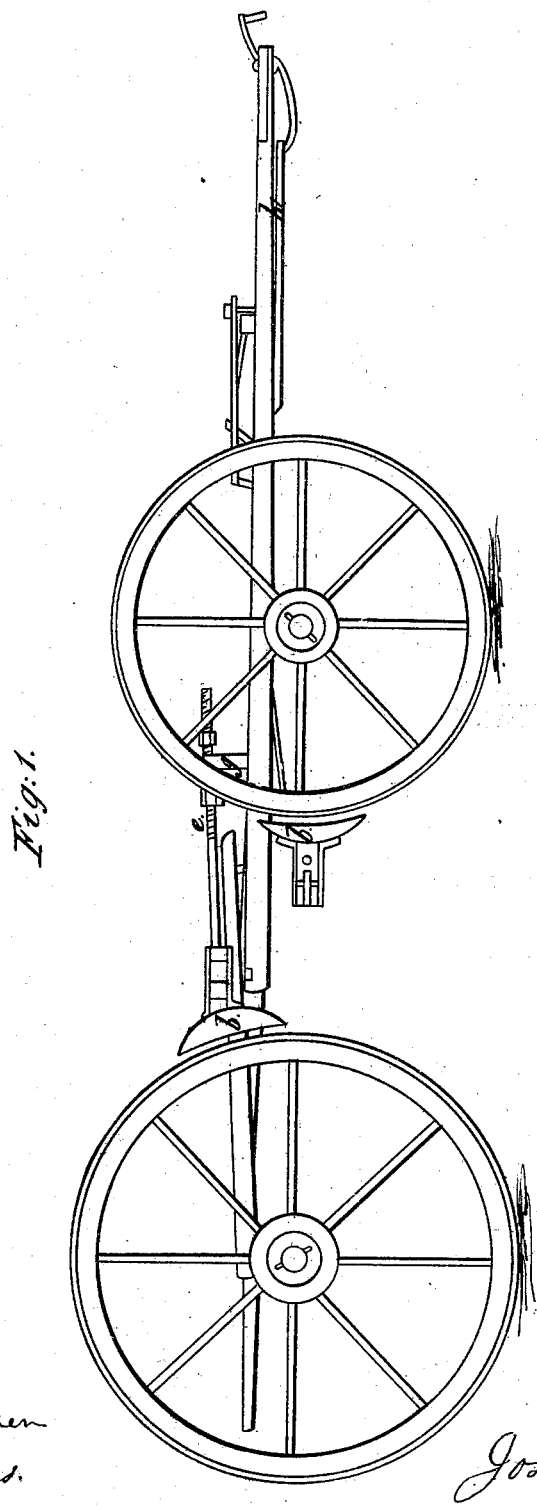

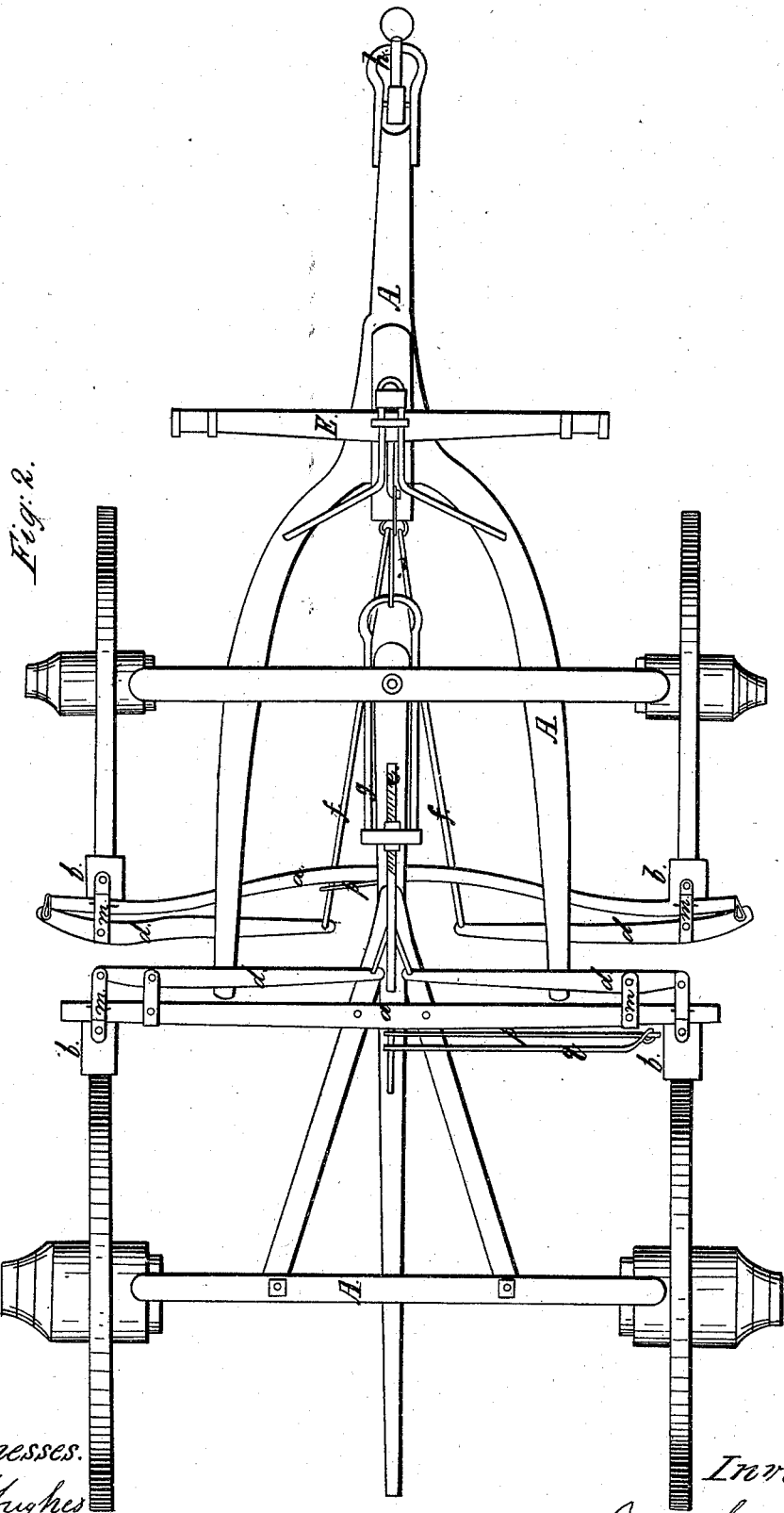

JOSIAH LONG, OF MORRISTOWN, INDIANA, ASSIGNOR TO J. G. WOLF, OF SAME PLACE.

WAGON-BRAKE.

Specification of Letters Patent No. 31,894, dated April 2, 1861.

*To all whom it may concern:*

Be it known that I, JOSIAH LONG, of Morristown, in the county of Shelby and State of Indiana, have invented certain new and useful Improvements in Wagon-Brakes; and I do hereby declare the following to be a full, clear, and exact description of the same, reference being had to the accompanying drawings, and to the letters of reference marked thereon, in which—

Figure (1) is a longitudinal section and Fig. (2) a plan view.

The nature of my invention consists in the employment and arrangement of certain devices, the peculiarities of which will be hereinafter fully set forth.

To enable others skilled in the art to make and use my invention I will now describe its construction and operation.

(A) represents a wagon of ordinary construction.

(a a) are brake bars.

(e) is a screw coupling rod which extends loosely through the center of the hind brake bar. Said coupling rod should be provided with a circular groove just behind the brake bar, the use of which will be more fully seen hereafter.

(d d d) are levers two of which are secured to and operated by the screw coupling rod, as fully shown in Fig. (2). (K K) are their fulcrums.

(b b) are rubbers shaped as seen in Fig. (1). Said rubbers are connected to levers (d d) by pieces (m m) which slide between staples or hooks driven in the brake bars (a a).

(f f) are rods which connect the front levers to the tongue rod (h). Said rods should also be provided with circular grooves just behind the brake bar.

(g) represents a screw adjustment which slips over the screw coupling bar and is regulated by means of a nut screwed on both sides as fully shown in Fig. (2). Thus may the wagon be either lengthened or shortened without in the least affecting the operation of the brakes.

(h) is a tongue rod which slides between staples driven in the tongue. Said rod is connected with screw adjustment (g) and connecting rods (f f).

(E) represents a sliding double tree arranged as fully shown in Fig (2).

(i) is a lever which connects the double tree to the tongue rod screw adjustment and rods (f f).

(x) represents a strap secured to the end of tongue rod (h). Said strap passes through the tongue near its end and is fastened to a ring, as seen in the drawings.

(p p) represents two levers which are pivoted to the brake bars. Said levers should have notches cut in them for the purpose of fitting in the circular grooves in the screw coupling in the rods (f f). Each of these levers is provided with hand levers (g g) which extend up the side of the bed and are hooked thereto. This arrangement is intended to shut off the brakes at any time in order that the wagon may be backed.

The peculiar merit of this invention consists in its being cheap, easy of construction, self acting and with all applicable either to two or four wheeled vehicles. Its operation is as follows: The horses being hitched to the double tree and their breast chains to the ring at the end of the tongue the wagon is put in motion. As it descends a hill the horses in holding back draw the tongue rod (h) forward, which from its connection already described presses the rubbers against the wheels. The moment the vehicle is on level ground again and the trace chains become tight the double tree slides forward and relieves the brake. Thus are the traces prevented from dangling under the horses' legs which is indeed not an infrequent cause of their running away. When the wagon is required to be backed the levers (p p) are pressed down into the circular grooves on the screw coupling rod and rods (f f), thus it will be seen preventing the brakes from pressing against the wheels.

Having thus fully described my invention what I claim and desire to secure by Letters Patent is—

1. The employment of the screw coupling (e) and screw adjustment (g) for the purpose of enabling the brakes of the hind and fore wheels to be used either separately or combined substantially as set forth.

2. The arrangement of levers (p p) screw coupling rod (e) screw adjustment (g) connecting rods (f f) lever (i) double tree (E) and levers (d d d) for the purpose herein set forth and described.

JOSIAH LONG.

Witnesses:
JNO. A. COYLE,
ALPHIUS TYNER.